(12) United States Patent
Brück et al.

(10) Patent No.: US 6,516,607 B1
(45) Date of Patent: Feb. 11, 2003

(54) METHOD AND DEVICE FOR CLEANING EXHAUST GAS CONTAINING NITROGEN OXIDE FROM AN INTERNAL COMBUSTION ENGINE

(75) Inventors: Rolf Brück, Bergisch Gladbach (DE); Wolfgang Maus, Bergisch Gladbach (DE)

(73) Assignee: EMITEC Gesellschaft fuer Emissionstechnologies mbH, Lohmar (DE)

( * ) Notice: Subject to any disclaimer, the term of this patent is extended or adjusted under 35 U.S.C. 154(b) by 0 days.

(21) Appl. No.: 09/694,439

(22) Filed: Oct. 23, 2000

Related U.S. Application Data

(63) Continuation of application No. PCT/EP99/02623, filed on Apr. 19, 1999.

(30) Foreign Application Priority Data

Apr. 22, 1998 (DE) .......................................... 198 17 994

(51) Int. Cl.[7] .................................................. F01N 3/00
(52) U.S. Cl. ............................ 60/274; 60/286; 60/303; 60/295
(58) Field of Search .......................... 60/274, 276, 285, 60/286, 295, 297, 303

(56) References Cited

U.S. PATENT DOCUMENTS

| | | | |
|---|---|---|---|
| 4,854,123 A | | 8/1989 | Inoue |
| 5,369,956 A | | 12/1994 | Daudel et al. |
| 5,410,873 A | * | 5/1995 | Tashiro .......................... 60/276 |
| 5,437,153 A | * | 8/1995 | Takeshima et al. ............ 60/286 |
| 5,806,310 A | * | 9/1998 | Daidou et al. ................. 60/286 |
| 5,813,224 A | * | 9/1998 | Rao et al. ....................... 60/274 |
| 6,119,448 A | * | 9/2000 | Emmerling et al. ........... 60/274 |
| 6,125,629 A | * | 10/2000 | Patchett ......................... 60/286 |
| 6,209,313 B1 | * | 4/2001 | Wissler et al. ................ 60/274 |

FOREIGN PATENT DOCUMENTS

| | | |
|---|---|---|
| DE | 36 15 021 A1 | 11/1987 |
| DE | 40 03 515 A1 | 8/1991 |
| DE | 43 03 807 A1 | 8/1993 |
| DE | 0 554 766 A1 | 8/1996 |
| DE | 297 08 591 U1 | 8/1997 |

OTHER PUBLICATIONS

Published International Application No. WO 83/00057 (Gladden), dated Jan. 6, 1983.
Published International Application No. WO 94/27035 (Schmelz), dated Nov. 24, 1994.

* cited by examiner

*Primary Examiner*—Thomas Denion
*Assistant Examiner*—Binh Tran
(74) *Attorney, Agent, or Firm*—Laurence A. Greenberg; Werner H. Stemer; Ralph E. Locher

(57) ABSTRACT

The method and the novel device clean exhaust gas containing nitrogen oxide from an internal combustion engine. Liquid ammonia is preferably added as reducing agent from a reducing agent reservoir through a reducing agent line and a metering device through the use of open loop or closed loop control synchronously and/or phase-displaced in a relation to the corresponding output of exhaust gas from the combustion chamber and in portions adjusted to the quantities of $NO_x$ generated. The synchronized and quantitatively adjusted addition of ammonia allows for $NO_x$ and ammonium emissions to be kept low with a catalytic converter disposed downstream and having a small storage volume.

32 Claims, 1 Drawing Sheet

METHOD AND DEVICE FOR CLEANING EXHAUST GAS CONTAINING NITROGEN OXIDE FROM AN INTERNAL COMBUSTION ENGINE

CROSS-REFERENCE RELATED APPLICATION

This application is a continuation of copending International Application PCT/EP99/02623, filed Apr. 19, 1999, which designated the United States.

BACKGROUND OF THE INVENTION

Field of the Invention

The present invention relates to a method and a device for cleaning exhaust gas containing nitrogen oxides ($NO_x$) from an internal combustion engine which includes at least one combustion space with an exhaust gas outlet, to which is connected an exhaust tract with an exhaust line and with at least one catalytic converter.

The combustion of hydrocarbons, such as occur, for example, in gasoline, with air in an internal combustion engine, in particular a diesel or gasoline engine, gives rise not only to carbon dioxide and steam as the main combustion products, but also to secondary products and pollutants. These are essentially hydrocarbons (HC), carbon monoxide (CO) and nitrogen oxide ($NO_x$). The amount of these pollutants which the exhaust gases contain depends, in particular, on the air/fuel ratio which prevails in the internal combustion engine. Low air/fuel ratios are referred to as "rich" mixture composition (air deficiency). A "lean" mixture composition (air excess) is due high air/fuel ratios.

It is known that, with an air deficiency, the exhaust gas contains a relatively large amount of CO and HC, whereas, in the case of an air excess, CO and HC may be oxidized almost completely. The $NO_x$ content passes through a maximum in the range of a slightly lean mixture composition. In this range, however, the specific consumption is also at an optimum for internal combustion engines, in particular for gasoline engines. If, therefore, for example gasoline engines are set at an optimally low consumption, there are high $NO_x$ concentrations, along with moderate CO and HC concentrations in the exhaust gas.

In particular, developments in traffic density in conurbations and metropoles have lead to the emission of the pollutants CO, HC and $NO_x$ being limited by law, first in the USA and later in Europe. The limits applicable at the present time, in particular for $NO_x$, cannot be adhered to through the use of so-called primary measures, that is to say by optimizing the combustion process in order to avoid the formation of pollutants, in particular of thermal $NO_x$. So-called secondary measures, in particular catalytic exhaust gas cleaning, are therefore employed in order to remain within these limits. Depending on the catalytic converter used, high conversion rates for all three of the above-mentioned pollutant components can be achieved in the case of a stoichiometric air/fuel ratio, but, in gasoline engines with lean mixtures and, in general, in diesel engines, the $NO_x$ fraction cannot be converted without additional measures.

For this purpose, it is known, for example from German Published, Non-Prosecuted Patent Application DE 40 03 515 A1, corresponding to U.S. Pat. No. 5,085,840, that, in order to reduce the $NO_x$ to $N_2$, a reducing agent is introduced from a reducing agent reservoir through a reducing agent line into the exhaust tract and is intermixed with the exhaust gas flowing in the latter. The exhaust-gas/reducing-agent mixture is then subsequently supplied to a catalytic converter for the catalytic conversion of the $NO_x$.

In this case, however, a stoichiometric ratio between $NO_x$ and reducing agent can be achieved only with difficulty because of fluctuating $NO_x$ concentrations in the exhaust gas: On one hand, continuous quantity metering of reducing agent at the level of $NO_x$ maxima which occur leads, below the $NO_x$ maxima, to an undesirable emission of reducing agent in the exhaust gas; on the other hand, a continuous quantity metering of reducing agent, for example at the level of an $NO_x$ average, leads, at the $NO_x$ concentrations in the exhaust gas which occur above this, to an undesirable emission of $NO_x$.

In order to solve this problem, in particular to minimize the losses of reducing agent, catalytic converters have been developed, the coating of which can absorb to saturation, that is to say has a storage capacity for reducing agent and/or $NO_x$. Using such a catalytic converter, the reducing agent can be introduced continuously in an average quantity into the exhaust tract. For example, overdoses of the reducing agent which occur are then stored in the catalytic converter and are discharged when $NO_x$ maxima occur later, and vice versa. However, for sufficient storage, this procedure necessitates a catalytic converter with a large storage volume.

SUMMARY OF THE INVENTION

It is accordingly an object of the invention to provide a method and a device for cleaning exhaust gas containing nitrogen oxide ($NO_x$) from an internal combustion engine, which overcome the hereinafore-mentioned disadvantages of the heretofore-known methods and devices of this general type and which are effective, in particular, even when a catalytic converter has a small storage volume.

With the foregoing and other objects in view there is provided, in accordance with the invention, a method of cleaning exhaust gas containing nitrogen oxide from an internal combustion engine having at least one combustion space with an exhaust gas outlet, and an exhaust tract with an exhaust line connected to the exhaust gas outlet and with at least one catalytic converter, the method which comprises:

introducing reducing agent from a reducing agent reservoir through a reducing agent line into the exhaust tract and intermixing the reducing agent with the exhaust gas flowing in the exhaust tract to form an exhaust-gas/reducing-agent mixture, whereby the reducing agent is metered more than once to the exhaust gas in dependence on an amount of $NO_x$ generated in the internal combustion engine, for each emission of exhaust gas from each combustion space, by at least one metering device and a further control device and/or regulating device, and thereby adapting portions of the reducing agent to the amounts of $NO_x$ respectively generated; and supplying the exhaust-gas/reducing-agent mixture to a catalytic converter for catalytically converting the $NO_x$.

With the above and other objects in view there is also provided, in accordance with the invention, a device for cleaning exhaust gas of an internal combustion engine containing nitrogen oxide, wherein the engine has at least one combustion space with an exhaust gas outlet, and an exhaust line of an exhaust tract is connected to the exhaust gas outlet, comprising:

a reducing agent reservoir and a reducing agent line connecting the reducing agent reservoir to the exhaust tract;

at least one metering device for introducing a reducing agent from the reducing agent reservoir through the reducing agent line into the exhaust tract and for intermixing the reducing agent with an exhaust gas flowing in the exhaust tract;

a catalytic converter connected in the exhaust tract for receiving an exhaust-gas/reducing-agent mixture for a catalytic conversion of nitrogen oxide produced in the internal combustion engine; and a control device connected to the metering device and configured to meter the reducing agent to the exhaust gas more than once by portion during each working stroke in dependence on a $NO_x$ content generated by the internal combustion engine.

In other words, the objects of the invention are satisfied in that the reducing agent is metered to the exhaust gas flowing in an exhaust tract, as a function of the generation of $NO_x$ by the internal combustion engine, through the use of a metering device and a further control device in synchronism with and/or out of phase with the respective emission of exhaust gas from a combustion space and in portions adapted to the $NO_x$ quantities generated, in particular in synchronism with and/or out of phase with the working stroke of the individual combustion spaces or in synchronism with and/or out of phase with a complete working stroke of the internal combustion engine. Such metering almost completely avoids overdoses of the reducing agent in the exhaust gas, as a result of which, for example, a stoichiometric ratio between $NO_x$ and reducing agent is achieved and cleaning exhaust gas containing $NO_x$ in an internal combustion engine is advantageously improved.

Moreover, the internal combustion engine preferably has an electronic engine control which, from data and measurement values available and/or arriving for controlling and/or regulating the internal combustion engine, also generates signals for controlling and/or regulating the metering device which are capable of being transmitted through the use of an electrical connection. The measurement values originate, for example, from measuring sensors which are disposed, for example, upstream and downstream of a catalytic converter located in the exhaust tract, the former transmitting, in particular, $NO_x$ and $NH_3$ measurement values and the latter, in particular $NH_x$, $NH_3$ and NO measurement values to the electronic engine control. As a result, advantageously, in particular, ammonia slippage which may possibly occur and also a residual emission of NO can be detected and can be corrected through the use of the electronic engine control. The catalytic converter preferably used according to the invention for cleaning the exhaust gas therefore advantageously has to store only to the extent of control fluctuations of $NO_x$ and/or reducing agent, for which purpose a large storage volume is not necessary.

In accordance with a preferred feature of the invention, the reducing agent used is fluid ammonia which is carried in a reducing agent reservoir and is introduced, as required, into the exhaust tract. Alternatively, the reducing agent may also be carried as a stored precursor, for example urea, in the reducing agent reservoir and can be produced as required, in particular pyrolitically, and subsequently introduced as fluid into the exhaust tract.

The metering device, which has, in particular, at least one metering valve, is disposed preferably between the reducing agent line and the exhaust tract. Since the reducing agent is present under a constant pressure in the reducing agent line, the portions of reducing agent to be metered can advantageously be determined solely through the opening times of the metering device, or through the opening times of each metering valve. The opening times of the metering device are controlled and/or regulated through the use of the signals generated in the electronic engine control, as a function of the data and measurement values present in said engine control, in particular as a function of consumption in relation to a fuel supply. As a result, according to the invention, preferably, for example, the stoichiometic ratio required in each case between the pollutant component $NO_x$ and the reducing agent ammonia can be achieved in the exhaust gas.

The reducing agent is therefore introduced from the reducing agent reservoir, for example, through the reducing agent line and the metering valve. The constant pressure in the reducing agent line is generated by a pressure generation device, in particular a pump. The metering valves are advantageously constructed in such a way that they ensure a reliable intermixing of the reducing agent in the exhaust gas, for example through the use of atomizer nozzles as outflow orifices.

Particularly preferably according to the invention, the reducing agent is in each case introduced and intermixed with the exhaust gas at the exhaust gas outlet of each combustion space of the internal combustion engine. Through the reducing agent being introduced in this way in synchronism with and/or out of phase with the respective emission of exhaust gas from each combustion space, the losses of reducing agent can be minimized and the metering of reducing agent organized, as required, particularly also in the case of lean mixtures and taking into account $NO_x$ maxima which occur in the exhaust gas, since the control and/or regulating frequency of the metering valves needs to be adapted in each case to the cycle of a combustion space only in synchronism and/or out of phase.

Alternatively and/or additionally, a reducing agent is introduced into the exhaust line and intermixed with the exhaust gas jointly for the exhaust gas of all of the combustion spaces. The introduction of the reducing agent into the exhaust line is distinguished in that, in this case, to achieve an approximately stoichiometric ratio between reducing agent and nitrogen oxides ($NO_x$), the ammonia can be introduced into the exhaust gas, in particular, with less outlay in terms of apparatus for this purpose, but with a higher control and/or regulating frequency of the at least one metering valve, said frequency being adapted to the cycles of all of the combustion spaces.

The quantity of ammonia required overall during a working stroke may, of course, be supplied in one or more metering operations distributed over the stroke, depending on requirements, for example as a function of rotational speed and load.

Other features which are considered as characteristic for the invention are set forth in the appended claims.

Although the invention is illustrated and described herein as embodied in a method and a device for cleaning exhaust gas containing nitrogen oxide ($NO_x$) from an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
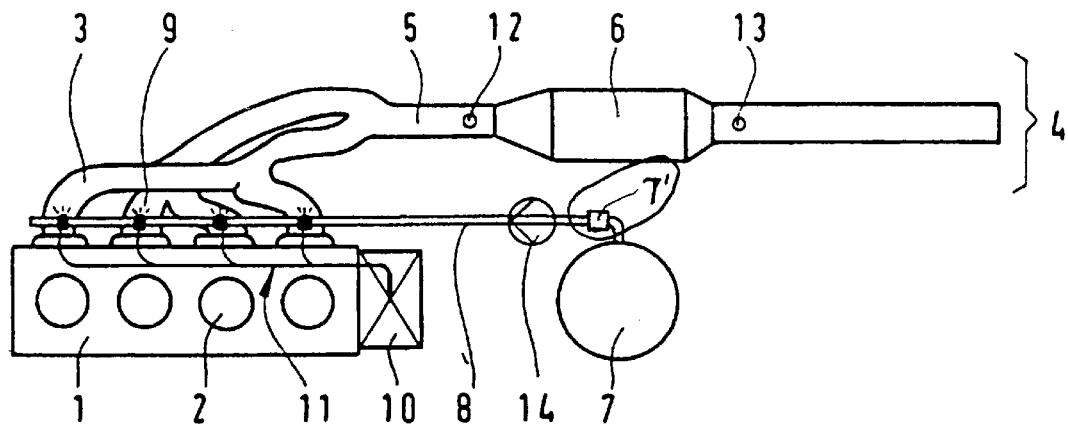
FIG. 1 is a fragmentary, side-elevational view of a first, particularly preferred, embodiment of the present invention.

Referring now to the figures of the drawings in detail and first, particularly, to FIG. 1 thereof, there is seen an internal combustion engine 1 which includes four combustion spaces 2, as is typical, for example, of a gasoline engine or a diesel engine. Connected to each of the four combustion spaces 2 is an exhaust gas outlet 3 issuing into an exhaust tract 4 which includes at least one exhaust line 5 and a catalytic converter 6 which preferably has a small storage capacity to the extent of control fluctuations for $NO_x$ and/or reducing agent. Disposed upstream of the catalytic converter 6 is at least one first measuring sensor 12 for the detection of, in particular, $NO_x$ or $NH_3$ measurement values and disposed downstream of the catalytic converter 6 is at least one second measuring sensor 13 for the detection of, in particular, $NO_x$, $NH_3$ or NO measurement values. Ammonia, as reducing agent, can be introduced from a reducing agent reservoir 7 through a reducing agent delivery line 8 through the use of a pump 14 into the exhaust tract 4 in each case at the exhaust gas outlet 3 of each combustion space 2 of the internal combustion engine 1 and can be intermixed, there being disposed between the reducing agent line 8 and each exhaust gas outlet 3 a metering valve 9 which is constructed in such a way that the ammonia is intermixed with the exhaust gas. The metering valves 9 are connected to the engine control 10 through an electrical connection 11. Alternatively, the reducing agent may also be carried as a stored precursor, for example urea, in the reducing agent reservoir and can be produced as required, in particular pyrolitically, by a device for producing fluid ammonia from a stored precursor 7', and subsequently introduced as fluid into the exhaust tract.

Exhaust gas containing nitrogen oxide ($NO_x$) is generated in the combustion spaces 2. In synchronism with the respective emission of exhaust gas from the combustion spaces 2, ammonia, as reducing agent, is metered through the metering valves 9, in portions adapted to the $NO_x$ quantity generated, to the still hot exhaust gas, in each case at the exhaust gas outlet 3 of each combustion space 2 of the internal combustion engine 1. Selective noncatalytic reduction (SNCR) can scarcely take place because of a lack of dwell time and/or exhaust gas temperatures below 920° C. The reduction of the $NO_x$ to $N_2$ is therefore carried out by selective catalytic reduction (SCR) in the catalytic converter 6, preferably at an exhaust gas temperature between 300° C. and 500° C. The ammonia itself is present continuously in the reduction agent line 8 at a constant pressure generated by the pump 14, so that the portions of the ammonia to be metered can be determined solely through the opening times of the metering valves 9 and can be introduced once in a high portion and/or more than once in a low portion, for example in relation to an emission of exhaust gas, preferably through the use of piezoelectric technology. The signals for controlling and/or regulating the opening times of the metering valves 9 are generated from data and measurement values available and/or arriving for controlling and/or regulating the internal combustion engine 1, in particular as a function of consumption in relation to a fuel supply, the data and measurement values which arrive in the engine control 10 originating partially from the measuring sensors 12, 13 disposed upstream and downstream of the catalytic converter 6.

Figure 2:
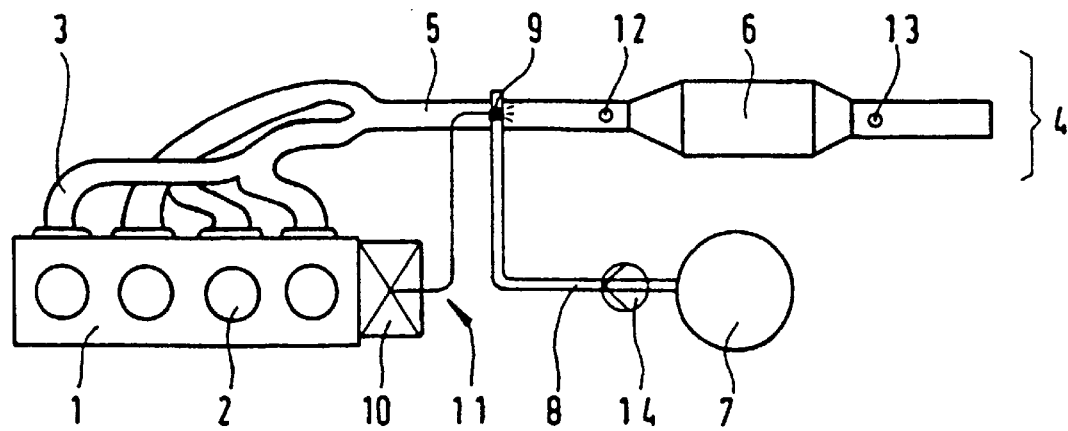
FIG. 2 is a view similar to FIG. 1 of a second embodiment of the present invention.

FIG. 2 shows an internal combustion engine 1, as in FIG. 1, with the difference that ammonia, as reducing agent, can be introduced into the exhaust gas line 5 through a reducing agent delivery line 8 jointly for the exhaust gas of all of the combustion spaces 2. The reducing agent is likewise present in the reducing agent line 8 at a constant pressure generated by a pump 14. The metering, preferred according to the invention, of the reducing agent to the exhaust gas as a function of the generation of $NO_x$ by the internal combustion engine 1 takes place in synchronism with and/or out of phase with the emission of joint exhaust gas from all of the combustion spaces 2, and in portions adapted to the $NO_x$ quantities generated, through a metering valve 9 which is disposed between the reducing agent line 8 and the exhaust line 5 and which is constructed in such a way that the ammonia is intermixed with the exhaust gas. Insofar as the $NO_x$ quantities generated are constant in the exhaust gas, the reducing agent is introduced continuously into the exhaust gas stream; insofar as fluctuations occur, this is carried out discontinuously. Introduction takes place, again, through the opening times of the metering valve 9 which are controlled or regulated through the use of signals generated from data and measurement values available for controlling and/or regulating the internal combustion engine 1.

Through ammonia being metered into the exhaust gas in a way adapted in terms of time and quantity, the emission of $NO_x$ and ammonia can thus be kept low, even when a downstream catalytic converter has only a small storage volume.

The method and device according to the invention for cleaning exhaust gas containing nitrogen oxide ($NO_x$) in an internal combustion engine are distinguished by their relative technical simplicity; furthermore, the end products do not have to be disposed of, since the nitrogen oxides ($NO_x$) contained in the exhaust gas are converted into water ($H_2O$) and molecular nitrogen ($N_2$) by the action of a catalytic converter, with ammonia ($NH_3$) being added or through the urea/ammonia chain.

We claim:

1. A method of cleaning exhaust gas containing nitrogen oxide from an internal combustion engine having at least one combustion space with an exhaust gas outlet, and an exhaust tract with an exhaust line connected to the exhaust gas outlet and with at least one catalytic converter, the method which comprises:

introducing reducing agent from a reducing agent reservoir through a reducing agent line into the exhaust tract and intermixing the reducing agent with the exhaust gas flowing in the exhaust tract to form an exhaust-gas/reducing-agent mixture, whereby the reducing agent is metered more than once to the exhaust gas in dependence on an amount of $NO_x$ generated in the internal combustion engine, for each emission of exhaust gas from each combustion space, by at least one metering device and a further control device, and thereby adapting portions of the reducing agent to the amounts of $NO_x$ respectively generated; and supplying the exhaust-gas/reducing-agent mixture to a catalytic converter for catalytically converting the $NO_x$.

2. The method according to claim 1, which further comprises metering the reducing agent to the exhaust gas by at least two metering devices disposed between the reducing agent line and the exhaust tract.

3. The method according to claim 1, which further comprises controlling a reducing agent flow in an immediate vicinity of an introduction point where the reducing agent is metered to the exhaust gas with each metering device.

4. The method according to claim 1, wherein the internal combustion engine has an electronic engine control, and which comprises generating signals for controlling the metering device in the engine control from data and measurement values available for controlling the internal combustion engine.

5. The method according to claim 1, which comprises storing with the catalytic converter one of $NO_x$ and reducing agent only to an extent dictated by process control fluctuations.

6. The method according to claim 1, which comprises introducing the reducing agent and intermixing with exhaust gas in each case at the exhaust gas outlet of each combustion space of the internal combustion engine.

7. The method according to claim 1, which comprises introducing the reducing agent into the exhaust line and intermixing with the exhaust gas jointly for the exhaust gas of all of the combustion spaces.

8. The method according to claim 1, which comprises introducing fluid ammonia from the reducing agent reservoir as the reducing agent into the exhaust tract.

9. The method according to claim 1, which comprises storing in the reducing agent reservoir a precursor of reducing agent, and producing therefrom the reducing agent and introducing the reducing agent into the exhaust tract in fluid phase.

10. The method according to claim 9, which comprises producing the reducing agent pyrolitically.

11. The method according to claim 9, which comprises storing urea as the precursor of ammonia.

12. The method according to claim 1, which comprises maintaining the reducing agent in the reducing agent line at a constant pressure, and determining the portions of the reducing agent to be metered through opening times of the metering device.

13. The method according to claim 12, which comprises controlling the opening times of the metering device through an electrical connection, by signals generated in an electronic engine control, in dependence on data and measurement values available therein.

14. The method according to claim 13, which comprises measuring parameters regarding fuel consumption and fuel supply with a plurality of sensors and providing corresponding data and measurement values to the electronic engine control.

15. A device for cleaning exhaust gas of an internal combustion engine containing nitrogen oxide, wherein the engine has at least one combustion space with an exhaust gas outlet, and an exhaust line of an exhaust tract is connected to the exhaust gas outlet, comprising:
- a reducing agent reservoir and a reducing agent line connecting said reducing agent reservoir to the exhaust tract;
- at least one metering device for introducing a reducing agent from said reducing agent reservoir through said reducing agent line into the exhaust tract and for intermixing the reducing agent with an exhaust gas flowing in the exhaust tract;
- a catalytic converter connected in the exhaust tract for receiving an exhaust-gas/reducing-agent mixture for a catalytic conversion of nitrogen oxide produced in the internal combustion engine; and
- a control device connected to said metering device and configured to meter the reducing agent to the exhaust gas more than once by portion during each working stroke in dependence on a $NO_x$ content generated by the internal combustion engine.

16. The device according to claim 15, wherein said control device is a closed-loop regulating device.

17. The device according to claim 15, wherein said metering device is one of two metering devices connected between said reducing agent line and the exhaust tract, each configured to meter the reducing agent into the exhaust gas.

18. The device according to claim 15, wherein said metering device has at least one metering valve, is disposed between said reducing agent line and the exhaust tract, and is configured to control a reducing agent flow.

19. The device according to claim 18, wherein said metering device is disposed in an immediate vicinity of an introduction point where the reducing agent is metered to the exhaust gas.

20. The device according to claim 15, wherein said catalytic converter is characterized with a low storage capacity for one of $NO_x$ and reducing agent within an extent of control fluctuations.

21. The device according to claim 15, wherein the internal combustion engine has an electronic engine control, and said metering device is configured to be controlled by the electronic engine control and by a further control device.

22. The device according to claim 21, wherein said further control device is connected to said metering device via an electrical connection.

23. The device according to claim 21, which comprises a first measuring sensor disposed upstream of said catalytic converter in an exhaust gas flow direction and transmitting to the electronic engine control $NO_x$ or $NH_3$ measurement values, and a second measuring sensor disposed downstream of said catalytic converter and transmitting to the electronic engine control $NO_x$, $NH_3$ or NO measurement values.

24. The device according to claim 15, wherein said reducing agent reservoir contains fluid ammonia as the reducing agent for introduction into the exhaust tract.

25. The device according to claim 15, which comprises a device for producing fluid ammonia from a stored precursor.

26. The device according to claim 25, wherein said device is configured to pyrolitically produce fluid ammonia from the stored precursor.

27. The device according to claim 25, wherein the stored precursor is urea.

28. The device according to claim 15, wherein the reducing agent is present in said reducing agent line at a constant pressure, such that the portions of the reducing agent to be metered can be determined through opening times of each metering valve of said metering device.

29. The device according to claim 28, which comprises a pressure generator connected to maintain the constant pressure in the reducing agent line.

30. The device according to claim 29, wherein the pressure generator is a pump.

31. The device according to claim 15, wherein said metering device comprises a metering valve disposed at each exhaust gas outlet of each combustion space of the internal combustion engine, for introducing the reducing agent and intermixing with the exhaust gas at the exhaust gas outlet of each combustion space.

32. The device according to claim 15, wherein said metering device is configured to introduce the reducing agent into the exhaust line from said reducing agent reservoir and through said reducing agent line jointly for the exhaust gas of all the combustion spaces of the internal combustion engine.

* * * * *